Figure 1:
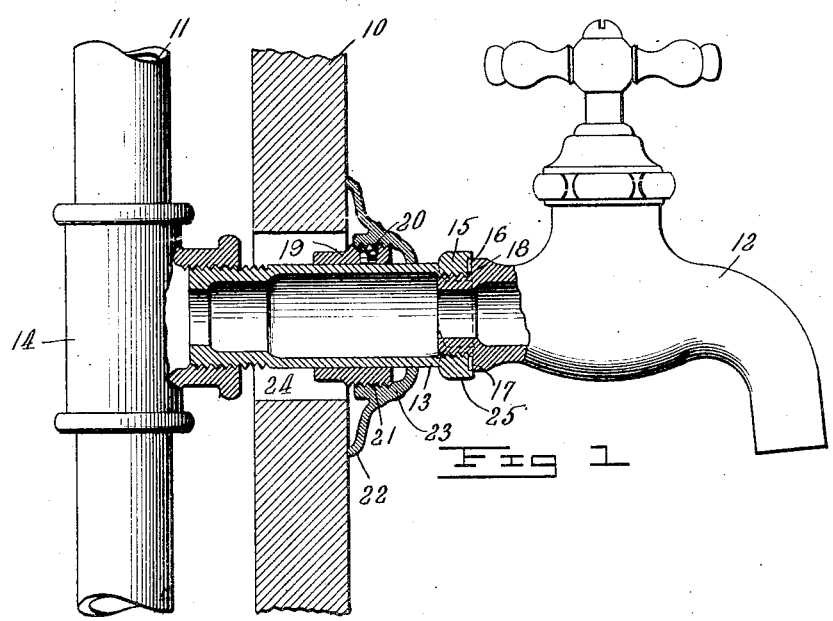

P. MUELLER.
PIPE CONNECTION.
APPLICATION FILED JULY 8, 1910.

980,880.

Patented Jan. 3, 1911.

Inventor
Philip Mueller

Witnesses

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

PIPE CONNECTION.

980,880.  Specification of Letters Patent.  Patented Jan. 3, 1911.

Application filed July 8, 1910. Serial No. 571,065.

*To all whom it may concern:*

Be it known that I, PHILIP MUELLER, a citizen of the United States, residing at Decatur, in the county of Macon and State of Illinois, have invented new and useful Improvements in Pipe Connections, of which the following is a specification.

My invention relates to pipe connections for use in connection with mains and fittings where the connection is made or has to be made through walls. While particularly designed for use in this connection, and while the specific embodiment described herein is especially adapted for this purpose, it will be evident upon a reading of the specification following that the joint of my invention may be used in many other situations.

At the present time in making connections from basins and closets through walls to mains, considerable difficulty is experienced in making a good joint owing to the lack of free space in the neighborhood of the basin or other fixture. Such fixtures are usually placed quite close to the wall, and many times in corners and out of the way places, and the space for making connections and for accommodating them after they are made is quite limited. On this account, as well as on account of the particular kind of joints heretofore used, alinement and righting of the mains and fittings with respect to each other has heretofore in many cases been extremely difficult. The pipes or connections used in connecting up baths and closets, are many times frail and easily bent or twisted, and this further increases the difficulty of making a satisfactory joint. The result of this is often a loose and unstable fitting or connection, which is very liable to leak or to break and very frequently rattles or vibrates in an annoying manner. This latter trouble is found in factories and other buildings where the building itself is in more or less vibration, due to the running of machinery which may be installed in it, and is very annoying.

The objects of my invention are to avoid the difficulties mentioned, and to produce a slip joint which will permit and promote the easy alinement and righting of parts, which is sturdy and rigid when made, which stays the parts in their correct positions, and which while sturdy and rigid is most easily made and broken without the use of special tools or special packing of any kind. A joint which may be easily made and broken is of special value in making close connections, and in making connections with traps or other such fittings which have to be more or less frequently taken down and cleaned out.

In the accomplishment of my invention I make use of the nipple of special form which I pass through the wall and screw thread into the main which is located adjacent to it. Adjustably mounted on this nipple I provide a collar, equipped with a countersunk set screw for clamping it in any desired position between the ends of the nipple. I screw thread on the exterior surface of this collar a nut provided with a foot-piece which bears against the wall, and with an interiorly extending flange which fits close upon the exterior surface of the nipple. This flange I may screw up with ease until it bears against the wall, and further until the parts are righted with respect to each other and with respect to the wall. Preferably I form the foot-piece associated with the nut in the shape of an integral outwardly extending flange which covers the adjustable collar from sight and makes a close connection with the wall, thus giving to the fittings a neat and attractive appearance, as well as insuring a cleanly joint conducive to the best sanitation. The inner end of the nipple I form with an enlarged interiorly threaded portion provided with a packing recess, and attach the fitting, such as a faucet, to this portion of the nipple on the opposite side of the wall from the main. Instead of the nipple I may thread the end of any pipe section to serve the same purpose and frequently this will be done.

My invention will be more fully understood and appreciated from the following description of the specific embodiment illustrated in the accompanying drawings, in which—

Figure 2:
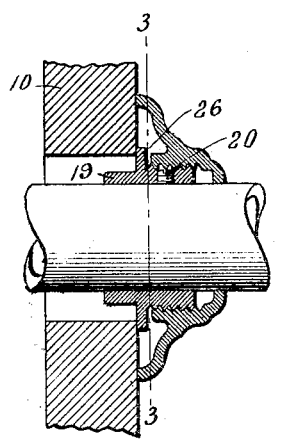
Figure 3:
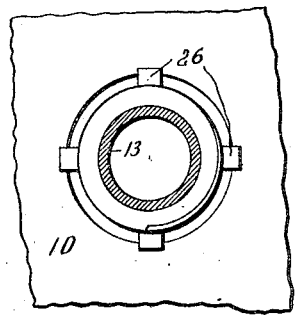

Figure 1 is a sectional elevation of my invention, Fig. 2 is a partial sectional elevation of a modified form, and Fig. 3 is a section taken on line 3—3 of Fig. 2, the foot-piece or clamping flange being omitted for the sake of clearness.

10 is the wall, adjacent to which on one side is the main 11, and on the other side of which is the fitting 12, shown in this instance as a faucet. This fitting is connected to the main 11 by a nipple 13 which is screw threaded into the tee 14 of the main and provided on the end to which the faucet is attached with an enlarged interiorly screw threaded portion 15. This portion is provided with a packing recess 16 in which is confined a packing 17 by the flange 18 of the attached faucet 12. Mounted on the body of this nipple between its ends, is an adjustable collar 19 equipped with a counter-sunk set screw 20 for clamping it in any adjusted position on the nipple. Screw threaded to the exterior surface of this collar is a nut 21 provided with a foot-piece 22 in the form of an integral flange, which extends outwardly and bears upon the wall 10. An inwardly extending flange 23 projects from the body of the nut into close contact with the outer surface of the nipple, thus hiding the collar and the aperture 24 through which the nipple passes from sight.

The joint of my invention is assembled with facility and ease in the following manner. The nut 21 and its attached parts and the adjustable collar 19 are placed on the nipple in the order shown in Fig. 1, and the nipple is then passed through the opening 24 in the wall and screw threaded into the tee 14 by means of a wrench applied on the nut 25 on the enlarged portion 15. Thereafter the collar 19 is moved to the proper position for the nut 21 to be best manipulated and clamped in position by driving home set screw 20. Nut 21 is then run up on the collar 19 until it bears against the wall 10, and further until it rights the main 11 and the fitting 12 with respect to each other and with respect to the wall, and stays them in sturdy and rigid relation with respect to each other and the wall. A nice close contact is made by the foot-piece or flange 22 with the wall, and in this form it covers the aperture 24 and the collar 19 and gives the fittings a very neat and attractive appearance. The connection made to the main in this manner, the fitting or the faucet 12 is inserted into the end of the nipple and screwed home and to an upright position. If desired this faucet or other fitting may be placed in the nipple, before the collar 19 and the nut 21 have been manipulated to right the nipple and the main.

Figs. 2 and 3 show a modification of my invention. This modification consists primarily in providing the collar 19 with lateral extensions 26 which project beyond the borders of the opening 24 in the wall 10, and bear against the inner surface of wall 10 in the same manner as does the foot-piece 22. By this provision a certain amount of the strain incident to righting the parts and staying them in position, is taken by the collar 19, the parts being righted by pulling upon the nipple 13 from the inner end and then shoving the collar up until the feet come into contact with the wall 10, and clamping it in position upon the nipple by the set screw 20. Under this condition and especially when the strain is small, the foot-piece or flange 22 may be made of sheet metal as is very common in pipe connections now in use. This form of my invention is especially adapted for use in connection with any form of pipe section. It is of course now evident that both forms of my invention may be so used.

I desire to have it understood that the specific embodiment illustrated by me in the drawings, and described by me in the specification is illustrative only, my invention being capable of many modifications, and of use in many situations other than that mentioned without in any wise departing from its generic spirit. I desire to cover all such modifications in the annexed claims.

What I claim is:—

1. The combination for connecting a fitting on one side of a wall to a main on the other, of a pipe section adapted to be directly connected with the main provided with an adjustable collar, a nut screw threaded to said collar, and a foot-piece associated with said nut.

2. In combination a main on one side of a wall, a fitting on the opposite side of said wall, a pipe section directly connecting said fitting to said main, an adjustable collar on said pipe section independent of said main and fitting, a nut screw threaded on said collar, and a foot-piece associated with said nut and bearing on said wall whereby said main and fitting are righted with respect to each other and stayed to said wall.

3. In combination a main on one side of a wall, a fitting on the opposite side of said wall, a pipe section directly connecting said fitting to said main, an adjustable collar separate from said main and fitting on said pipe section, a countersunk set screw associated with said collar for clamping the same in position, a nut screw threaded on said collar, a foot-piece associated with said nut and bearing on said wall whereby said main and fitting are righted with respect to each other and stayed to said wall.

4. In combination a main on one side of a wall, a fitting on the opposite side of said wall, a pipe section connecting said fitting to said main, an adjustable collar on said pipe section, lateral extensions projecting directly from said collar into engagement with said wall, a nut screw threaded on said collar, and a foot piece associated with said nut and bearing on said wall whereby said main and fitting may be righted with respect to each other and stayed to said wall.

5. In combination a main on one side of a wall, a pipe section projecting through said wall, and screw threaded into said main at its one end, said pipe section having an enlarged interiorly screw threaded portion at the other end, a packing recess in said end, a fitting screw threaded into said end, a packing in said recess between the end of said pipe section and the fitting, an adjustable collar mounted on said pipe section between its ends, means for clamping said collar in adjusted position, and a flange adapted to bear against the wall screw threaded to said collar and completely hiding the same when in position.

6. In combination a main adjacent to a wall, a pipe section screw threaded into said main and passing through said wall, said pipe section having an enlarged portion on the end away from said main, an adjustable collar mounted on said pipe section between its ends, means for clamping said collar in position, and a flange screw threaded to said collar and bearing on said wall.

In testimony whereof I have hereunto set my hand in presence of two subscribing witnesses.

PHILIP MUELLER.

Witnesses:
WILLIAM R. BIDDLE,
WILLIAM R. GUSTIN.